US 9,367,641 B2
Jun. 14, 2016

(12) United States Patent
Kwan et al.

(54) PREDICTIVE WEB PAGE RENDERING USING A SCROLL VECTOR

(71) Applicant: Qualcomm Innovation Center, Inc., San Diego, CA (US)

(72) Inventors: Wilson Kwan, Markham (CA); Stewart Chao, Markham (CA)

(73) Assignee: Qualcomm Innovation Center, Inc., San Diego, CA (US)

( * ) Notice: Subject to any disclaimer, the term of this patent is extended or adjusted under 35 U.S.C. 154(b) by 446 days.

(21) Appl. No.: 13/728,415

(22) Filed: Dec. 27, 2012

(65) Prior Publication Data

US 2014/0189487 A1 Jul. 3, 2014

(51) Int. Cl.
 *G06F 17/00* (2006.01)
 *G06F 17/30* (2006.01)
(52) U.S. Cl.
 CPC .... *G06F 17/30905* (2013.01); *G06F 17/30899* (2013.01)
(58) Field of Classification Search
 CPC ............. G06F 3/1242; G06F 17/2247; G06F 17/30905; G06F 17/30899
 USPC ........................................................ 715/838
 See application file for complete search history.

(56) References Cited

U.S. PATENT DOCUMENTS

| | | | | |
|---|---|---|---|---|
| 7,489,318 B1* | 2/2009 | Wilt | ............................. | 345/582 |
| 2004/0233219 A1* | 11/2004 | Aguera y Arcas | ............ | 345/606 |
| 2006/0033753 A1* | 2/2006 | Lai | ................................. | 345/629 |
| 2008/0122835 A1* | 5/2008 | Falco, Jr. | ........................ | 345/419 |
| 2009/0164567 A1* | 6/2009 | Hara | ............................... | 709/203 |
| 2010/0123732 A1* | 5/2010 | Jenks et al. | ..................... | 345/592 |
| 2011/0131535 A1* | 6/2011 | Tagami et al. | ................. | 715/838 |
| 2011/0169840 A1* | 7/2011 | Bakalash | ....................... | 345/505 |
| 2012/0005258 A1* | 1/2012 | Cok et al. | ...................... | 709/203 |
| 2012/0110426 A1* | 5/2012 | Ran et al. | ...................... | 715/207 |
| 2012/0256949 A1* | 10/2012 | Treat et al. | .................... | 345/629 |
| 2013/0050249 A1* | 2/2013 | Grabowski et al. | ........... | 345/619 |
| 2013/0061159 A1* | 3/2013 | Tseng et al. | .................. | 715/760 |
| 2013/0111368 A1* | 5/2013 | Laughlin | ....................... | 715/760 |

(Continued)

OTHER PUBLICATIONS

Hidayat, Ariya, "Don't Code Today What You Can't Debug Tomorrow" Jun. 27, 2011, webpage located at http://ariya.blogspot.com/2011/06/progressive-rendering-via-tiled-backing.html downloaded Jan. 16, 2013, Publisher: Ariya Hidayat, Published in: US, p. 5.

(Continued)

*Primary Examiner* — Scott Baderman
*Assistant Examiner* — Howard Cortes
(74) *Attorney, Agent, or Firm* — Neugeboren O'Dowd PC

(57) ABSTRACT

Systems, methods, and apparatus for improving a user experience during viewport scrolling is herein disclosed. Rendering and drawing of a viewport is performed for a destination viewport based on a viewport scroll vector calculated from a user scroll input at a display device. The destination viewport is rendered before viewports between a starting viewport and the destination viewport so that there is no lag in rendering when the scrolling action reaches the destination viewport. The compromise is that intermediate viewports may be rendered based on a thumbnail image in low resolution, but since these low-resolution portions of the webpage are viewed briefly as the webpage scrolls to the destination viewport, a user is unlikely to notice the reduced resolution.

12 Claims, 11 Drawing Sheets

(56) References Cited

U.S. PATENT DOCUMENTS

2013/0290860 A1* 10/2013 Lethers et al. ................ 715/744
2014/0139534 A1* 5/2014 Tapply et al. ................ 345/522

OTHER PUBLICATIONS

Hidayat, Ariya, "Understanding Hardware Acceleration on Mobile Browsers" Jul. 15, 2011, webpage located at http://www.sencha.com/blog/understanding-hardware-acceleration-on-mobile-browsers/ downloaded Jan. 16, 2013, Publisher: Sencha Inc., Published in: US, p. 6.

The Chromium Projects, "GPU Accelerated Compositing in Chrome," Updated May 2012, webpage located at https://sites.google.com/a/chromium.org/dev/developers/design-documents/gpu-accelerated-compositing-in-chrome downloaded Jan. 16, 2013, Publisher: Google Sites, Published in: US, p. 16.

* cited by examiner

PREDICTIVE WEB PAGE RENDERING USING A SCROLL VECTOR

BACKGROUND

1. Field

The present disclosed embodiments relate generally to web browsing, and more specifically to rendering web pages during scrolling.

2. Background

Web page rendering includes DOM tree parsing, layout, render tree generation, and rendering. The final phase, rendering, draws the web page onto a viewport of a display device, and the duration of rendering largely dictates the user experience. Maintaining a high user experience is especially difficult during scrolling since there is very little time to render a large amount of content. At the same time, the rendering phase is computationally taxing. As a user scrolls down a page each section of the page is scheduled to a rendering engine sequentially in the scroll direction. For complex pages, some elements cannot be rendered in real time so blank sections (or tiles) are generated as the page scrolls by.

There is therefore a need in the art for systems, methods, and apparatus capable of providing a high user experience during rapid scrolling despite the existence of complex pages and content.

SUMMARY

Embodiments disclosed herein address the above stated needs by rendering some complex portions of a webpage from a thumbnail image and/or by prioritizing rendering of a destination viewport over intermediate viewports during scrolling.

One aspect of the invention can be described as a computing device for rendering and displaying portions of a webpage. The computing device can include a viewport, a webpage memory block, a thumbnail memory block, a tile memory block, a viewport memory block, and a processor system. The webpage memory block can receive and store data that is used to render a webpage. The thumbnail memory block can store a thumbnail image of the webpage rendered from the data in a first resolution. The tile memory block can store the webpage as one or more tiles. Each of the one or more tiles can render from one or more portions of the data in a second resolution higher than the first resolution. The viewport memory block can store a copy of at least one portion of the thumbnail memory block and can store copies of the one or more tiles. The processor system can render the thumbnail image of the webpage from the data to the thumbnail memory block. The processor system can also, when the processor system attempts to copy one of the one or more tile to the viewport memory block, determine that the processor system has not rendered, or has not finished rendering, at least one tile to the tile memory block from the one or more portions of the data. In response, the processor system can copy portions of the thumbnail image to the viewport memory block corresponding to the tile that was not rendered.

Another aspect of the invention can be described as a method of rendering a webpage. The method can include copying tile images from a tile memory block to a viewport memory block of a computing device, each tile image being a rendering of a subsection of the webpage in a first resolution. The method can also include determining that copying one of the tile images is not possible because the one of the tile images has not been rendered to the tile memory block. The method can further include copying a subsection of a thumbnail image from a thumbnail memory block of the computing device to the viewport memory block in place of the one of the tile images that has not been rendered, the thumbnail image being a rendering of the webpage in a second resolution lower than the first resolution.

Yet another aspect of the invention can be described as a system for rendering and displaying a webpage. The system can include means for rendering a starting viewport of a display device based on a portion of webpage data received by the system. The system can also include means for detecting a viewport scroll input at a display device of the system. The system can yet further include means for calculating a viewport scroll vector based on the viewport scroll input, the viewport scroll vector having a distance and a direction value. The system can also include means for calculating a position of a destination viewport by adding the viewport scroll vector to a position of the starting viewport. The system can further include means for rendering the destination viewport of the display device before rendering any portions of intermediate viewports, the intermediate viewports being arranged between the starting and the destination viewports.

Another aspect of the invention can be described as a system for rendering and drawing a webpage. The system can include a display device having a viewport and displaying: a first portion of a webpage; then one or more intermediate portions of the webpage; and then a second portion of the webpage. The one or more intermediate portions of the webpage can be located between the first and second portions of the webpage. The display device can further be configured to detect a user viewport scroll input. The system can also include a viewport vector calculating module that calculates a viewport scroll vector, having a distance value and a direction value, and being based on the user viewport scroll input. The system can yet further include a destination viewport calculating module that identifies the second portion of the webpage by adding the viewport scroll vector to a position of the first portion of the webpage. The system can yet further include a processor that renders the second portion of the webpage before rendering any of the one or more intermediate portions of the webpage.

Yet another aspect of the invention can be described as a non-transitory, tangible computer readable storage medium, encoded with processor readable instructions to perform a method for rendering a webpage. The method can include rendering a starting viewport of a display device, and detecting a viewport scroll input from the computing device. The method can yet further include calculating a viewport scroll vector based on the viewport scroll input, the viewport scroll vector having a distance value and a direction value, and calculating a destination viewport by adding the viewport scroll vector to a position of the starting viewport. The method can further include rendering the destination viewport of the display device before rendering any portions of intermediate viewports in between the starting and the destination viewports.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 6:
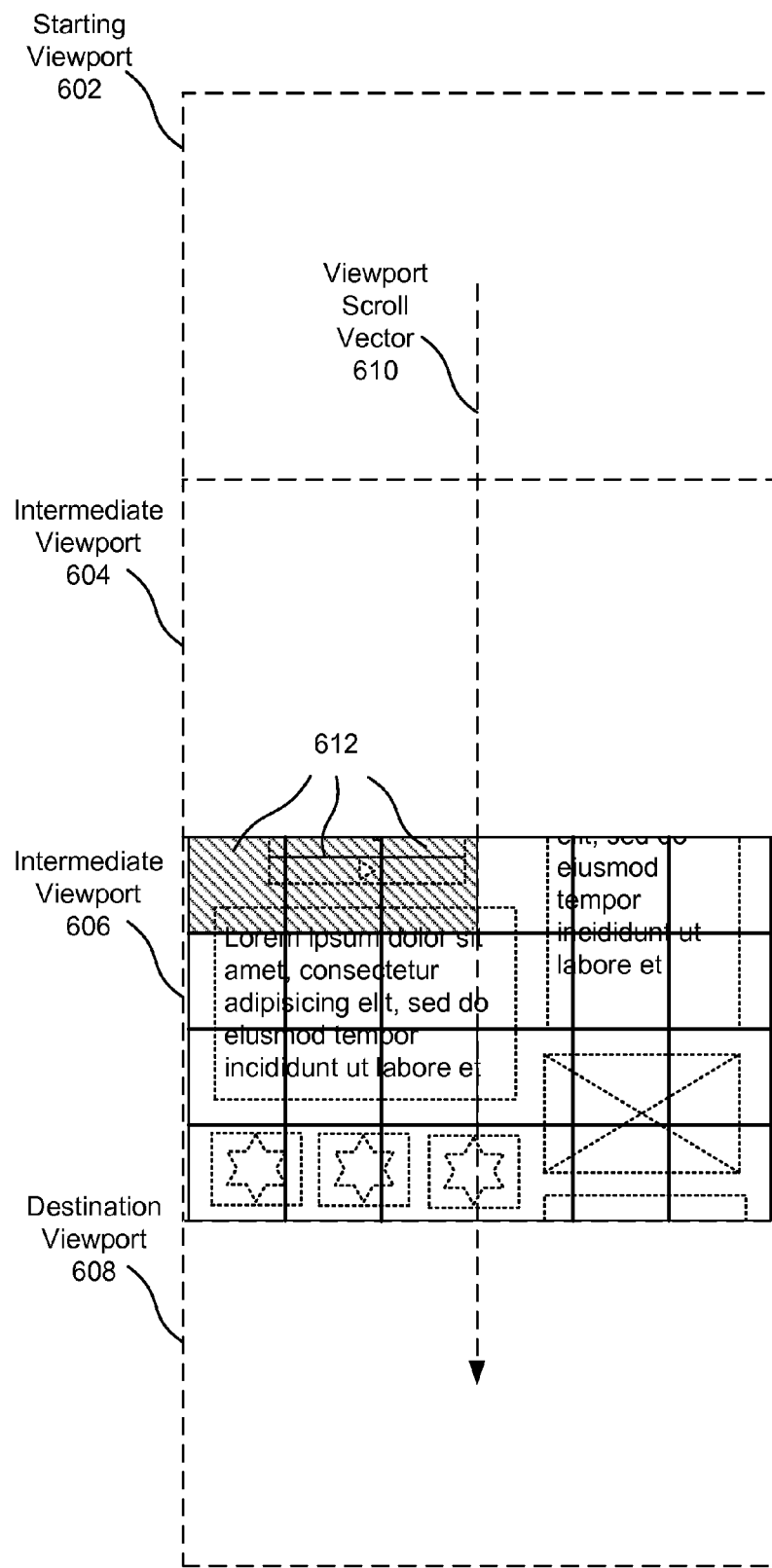
FIG. 6 illustrates a current viewport's movement down a webpage during scrolling.

As noted above, webpage content downloads and is cached before rendering. High resolution rendering sometimes cannot be carried out fast enough to keep up with rapid scrolling on a viewport, especially where there are processor-intensive tiles to render (e.g., image tiles). For instance, FIG. 6 illustrates a webpage having four viewports 602, 604, 606, and 608, and only intermediate viewport 606 is displayed as the viewport scrolls from the starting viewport 602 to the destination viewport 608. Because of the speed of scrolling, some tiles having images in them, 612, are processor-intensive to render. In the art, these tiles would display as blanks because high resolution rendering either did not have time to occur or did not have time to finish.

In this disclosure, a webpage is rendered as a set of high resolution tiles, each tile representing a portion of the webpage. At the same time, the whole webpage is rendered as a thumbnail image, in a resolution lower than the high resolution. When a high resolution tile is either not rendered, or rendering does not complete in time (e.g., the high resolution tile is not available for display), then a portion of the thumbnail image can be displayed to fill in the blank tile. In this way, tiles that would traditionally not be displayed (e.g., tiles 612), or displayed as a blank space, are instead displayed in low resolution. This technique is especially effective during scrolling when a user is less able to distinguish between the high and low resolution tiles, yet the low resolution tiles provide a much more seamless aesthetic than if some of the tiles remained blank.

The thumbnail can be continually, periodically, or arbitrarily regenerated or updated to account for changes in the webpage and dynamic portions of the webpage (e.g., animations or video). In some cases this updating can occur by taking rendered high resolution tiles and making low resolution copies of those tiles that can be used to substitute for portions of the thumbnail image. In some embodiments, rendering the thumbnail image and the high resolution tiles in parallel can be accomplished by splitting these tasks amongst one or more cores of a processor.

Figure 2:
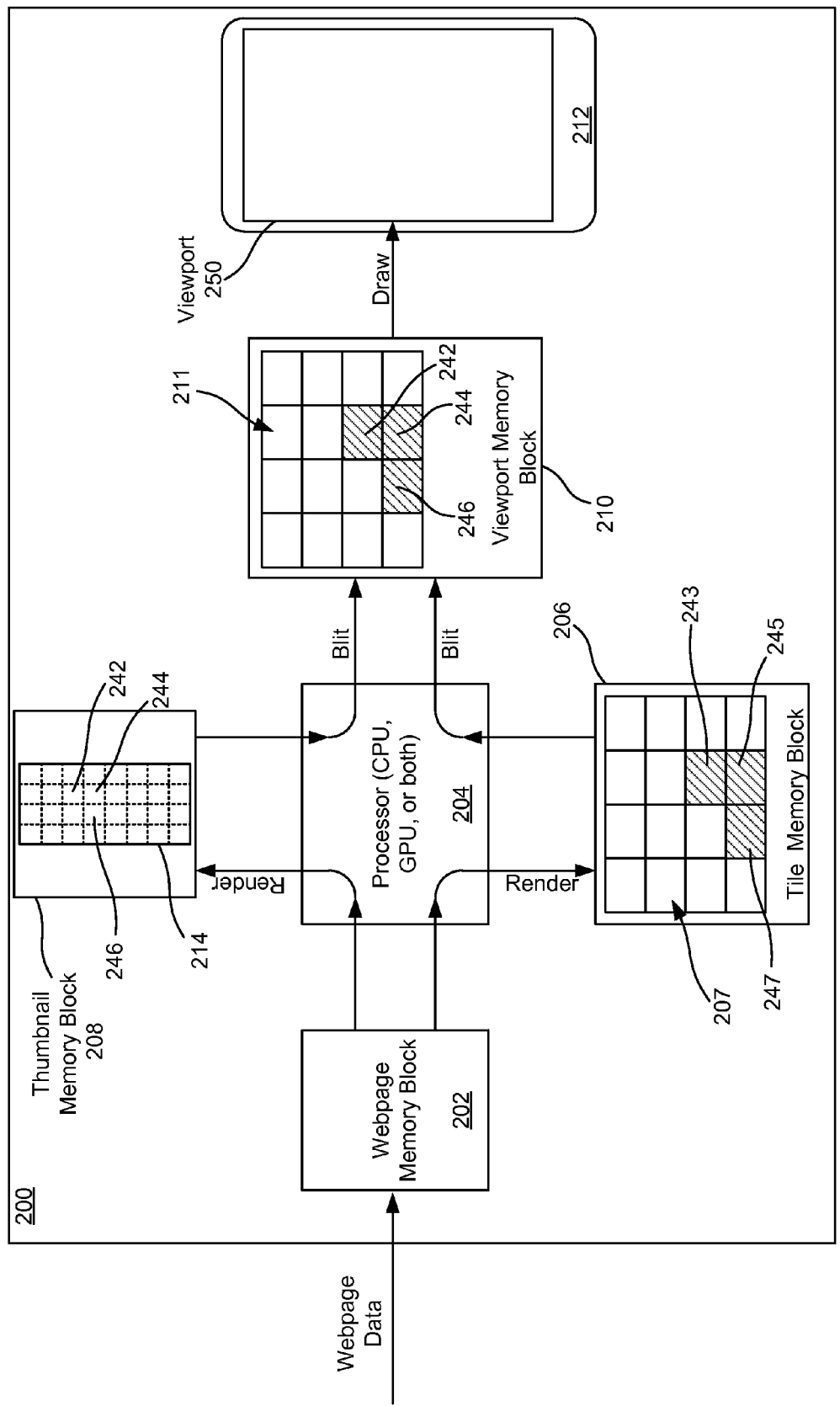
FIG. 2 illustrates a computing system 200 that renders a webpage using a combination of high resolution tiles and tiles derived from a thumbnail rendering.

FIG. 2 illustrates a computing system 200 that renders a webpage using a combination of high resolution tiles and tiles derived from a thumbnail rendering. Webpage content is downloaded to the computing device 200 in data packets, and the data packets are received by and stored in a webpage memory block 202 (also referred to as caching the data packets). A processor 204, such as a CPU, GPU, or a combination of resources from both a CPU and a GPU, renders portions of the webpage and stores the portions in a tile memory block 206. These portions are rendered as 'tiles' 207 and are rendered in a first resolution that matches or is similar to a resolution of a viewport 250 of a display device 212 (e.g., a PC monitor, a television, a display of a tablet computer or smartphone, etc.). This first resolution can also be referred to as a high resolution. The tiles 207 are rendered preferentially starting with tiles that are to be displayed in a current viewport, the viewport 250 as currently visible. When the viewport 250 changes (e.g., due to user scrolling the viewport 250) new high resolution tiles can be rendered from the webpage memory block 202 to the tile memory block 206.

Because of the processor 204 resources required to render all of the tiles of the viewport 250 in high resolution, and especially where some of the tiles are especially taxing on the processor 204 to render (e.g., high resolution images or video on a webpage), some tiles may not render or may not render by the time the viewport 250 changes (e.g., via scrolling). As seen, three tiles, 243, 245, 247, as indicated via hashed shading, have not rendered or have not rendered by the time the viewport 250 changes.

Because of this, the processor 204 can also render a thumbnail image of the webpage to a thumbnail memory block 208. The thumbnail image can be rendered in a second resolution that is lower than the first resolution and therefore also referred to as a low resolution. The thumbnail image 214 can be referenced according to portions that correspond to the high resolution tiles 207, but will also include portions 242, 244, 246 corresponding to the non-rendered high resolution tiles 243, 245, 247.

High resolution tiles 207 that are available in the tile memory block 204, and that correspond to the current viewport 250 are copied, or blitted, to a viewport memory block 210 (e.g., a graphics device buffer). Blitting can be performed in a fraction of the time that rendering takes. Once blitted into the viewport memory block 210, the high resolution tiles 207 are drawn to the viewport 250. Where a high resolution tile is not available in the tile memory block 206 for copying to the viewport memory block 210 (e.g., 243, 245, 247), a portion of the thumbnail image 214 in the thumbnail memory block 206 can be copied, or blitted, to the viewport memory block 210 (e.g., 242, 244, 246) and drawn to the viewport 250. In this way, tiles 211 that are drawn to the viewport 250 are never, or substantially never, displayed as blanks, but rather, when not available in the tile memory block 204, they are drawn from low resolution tiles, as blitted from the thumbnail image 214.

Rendering can involve rasterizing a tile from the web page data stored in the web page memory block 202.

The memory blocks 202, 206, 208, 210 can be embodied as buffers. Buffers can reside in one or more memory systems or memory components. For instance, the webpage memory block 202 can be in RAM or a cache of the processor 204, to name two non-limiting examples. The memory blocks 202, 206, 208, 210 can also be arranged in separate portions of a single memory system or component (e.g., RAM) or can be distributed amongst different memory systems (e.g., the webpage memory block 202 can be in RAM and the other memory blocks can be in a GPU cache). A single memory system or component may include one or more hardware devices. For instance, RAM is often distributed between multiple RAM modules each separately affixed to a motherboard or other circuit board. In some cases, separate RAM modules are fixed to each other in a stacked fashion and interconnected via through-wafer-vias, bump bonds, or wire bonds. Needless to say, the memory blocks 202, 206, 208, 210 can be implemented in a variety of ways commonly-known to those of skill in the art, and are not limited to the examples herein provided. In one embodiment, the tile memory block 206 is embodied as a tile backing store. In another embodiment, both the tile memory block 206 and the thumbnail memory block 208 are part of a tile backing store.

Operations can be performed on the webpage data packets before or after they are stored in the webpage memory block 202 to prepare the data packets for rendering, where these operations and their timing do not affect the scope of this invention. For instance, data packets may be analyzed to generate a DOM tree and render nodes, which may be stored in the webpage memory block 202. In another example, the nodes may be rendered via a remote processing unit.

Figure 3:
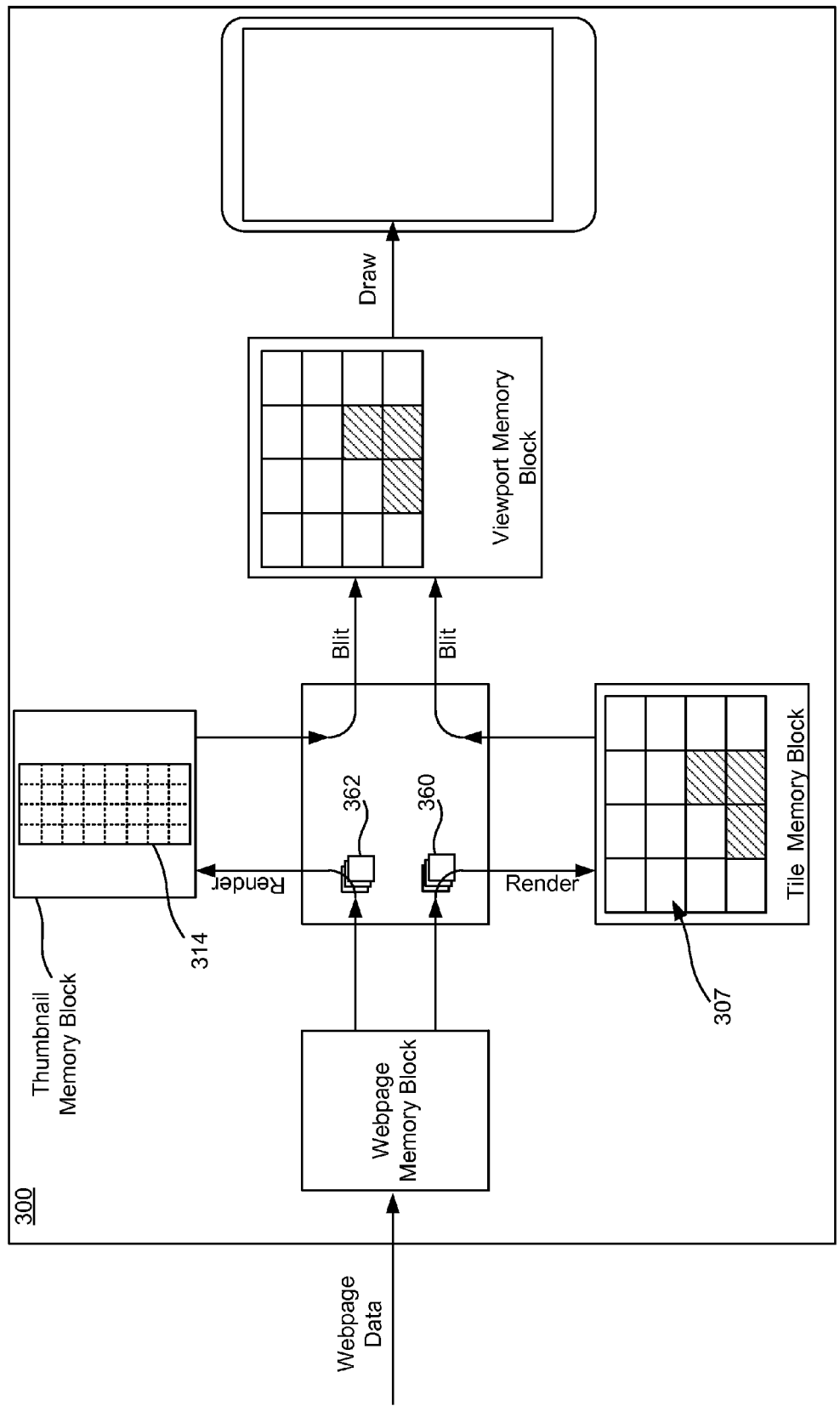
FIG. 3 illustrates an embodiment where rendering and blitting of tiles is performed via a processor system having multiple cores.

The processor 204 can comprise one or more cores and receive processes in one or more parallel processes (e.g., threads). The processor 204 may represent two or more processors, for instance where a CPU and a GPU, or two CPUs, are both used to perform the operations discussed above in reference to FIG. 2. Either of a CPU and/or GPU that makes up the processor 204 can include one or more cores, and therefore perform operations such as rendering and blitting in parallel. In some instances, rendering of the thumbnail image 214 (including updating the thumbnail image 214) can be performed in parallel with rendering one or more high resolution tiles 216-228. In FIG. 3, an embodiment is illustrated, where a plurality of high resolution tiles 307 are rendered on a first set of one or more cores 360 in parallel with rendering (including updating) of a thumbnail image 314 on a second set of one or more cores 362.

The viewport 250 can be equal to or smaller than a maximum display size for the display device 212. The draw operation can be processed on a display processor (e.g., GPU), which may or may not be part of the processor 204. In other cases, the draw operation is carried out via a display controller (not illustrated).

The dotted lines in the thumbnail image 214 represent portions of the thumbnail image 214 that can be blitted to the viewport memory block and can correspond to tiles 207 of the tile memory block 206. The dotted lines represent logical partitions and do not represent actual file separations in the thumbnail memory block 208. In comparison, the tiles 207 in the tile memory block 206 can each be separate files with separate addresses in the tile memory block 206.

The thumbnail image 214 and the high resolution tiles 207 can be rendered in parallel. In some embodiments, the thumbnail image 214 may be rendered as a background process. Thus, before the thumbnail image 214 has completed rendering, it is possible that scrolling of the viewport 250 may result in one or more blank rather than low resolution tiles. However, once the thumbnail image 214 has completed rendering to the thumbnail memory block 208 or at least a portion of the thumbnail image 214 corresponding to an otherwise blank high resolution tile (e.g., 243, 245, 247) has completed rendering, then that portion of the thumbnail image 214 can be blitted to the viewport memory block 210 and blank tiles can be drawn from low resolution tiles in the viewport memory block 210.

In some embodiments, the thumbnail image 214 can be updated to account for dynamic content on the webpage or merely for changes to content on a static webpage. Updates can be performed by copying high resolution tiles 207 from the tile memory block 206, reducing a resolution of the copied tiles, and replacing portions of the thumbnail image with the reduced-resolution copies of one or more of the tiles 207.

Figure 4:
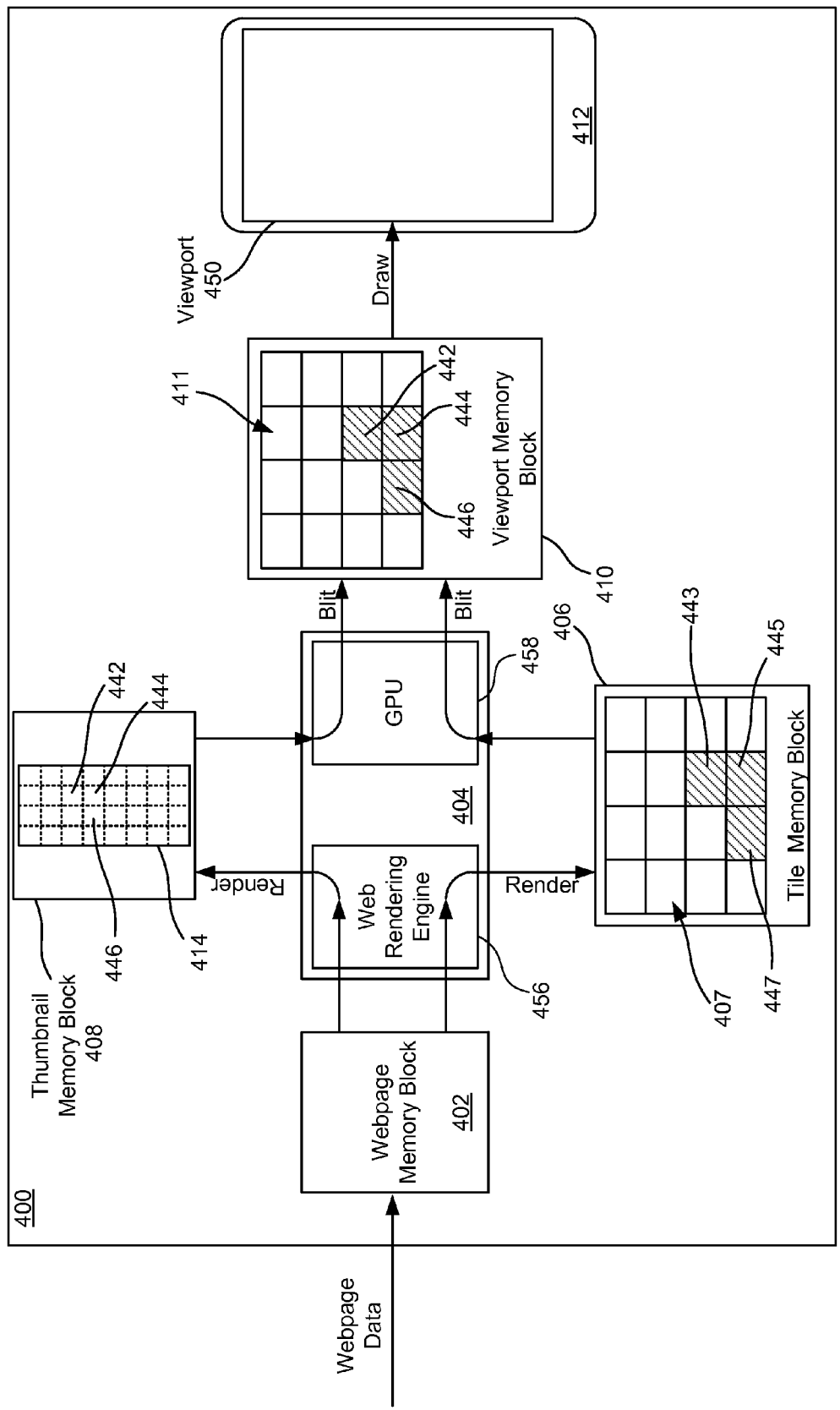
FIG. 4 illustrates a method of rendering a webpage using a combination of high resolution tiles and tiles derived from a thumbnail rendering.

FIG. 4 illustrates a method of rendering a webpage using a combination of high resolution tiles and tiles derived from a thumbnail rendering. Webpage content is downloaded to the computing device 400 in data packets, and the data packets are received by and stored in a webpage memory block 402 (also referred to as caching the data packets). A processor system 404, including a web rendering engine 456, renders portions of the webpage and stores the portions in a tile memory block 406 via the web rendering engine 456. These portions are rendered as 'tiles' 407 and are rendered in a first resolution that matches or is similar to a resolution of a viewport 450 of a display device 412 (e.g., a PC monitor, a television, a display of a tablet computer or smartphone, etc.). This first resolution can also be referred to as a high resolution. The tiles 407 are rendered preferentially starting with tiles that are to be displayed in a current viewport, the viewport 450 as currently visible. When the viewport 450 changes (e.g., due to user scrolling the viewport 450) the web rendering engine 456 can render new high resolution tiles from the webpage memory block 402 to the tile memory block 406.

Because of the processor 404 resources required to render all of the tiles of the viewport 450 in high resolution, and especially where some of the tiles are especially taxing on the web rendering engine 456 to render (e.g., high resolution images or video on a webpage), some tiles may not render or may not render by the time the viewport 450 changes (e.g., via scrolling). As seen, three tiles, 443, 445, 447, as indicated via hashed shading, have not rendered or have not rendered by the time the viewport 450 changes.

Because of this, the web rendering engine 456 can also render a thumbnail image of the webpage to a thumbnail memory block 408. The thumbnail image can be rendered in a second resolution that is lower than the first resolution and therefore also referred to as a low resolution. The thumbnail image 414 can be referenced according to portions that correspond to the high resolution tiles 407, but will also include portions 442, 444, 446 corresponding to the non-rendered high resolution tiles 443, 445, 447.

High resolution tiles 407 that are available in the tile memory block 404, and that correspond to the current viewport 450 are copied, or blitted, to a viewport memory block 410 (e.g., a graphics device buffer) via a graphics processing unit (GPU) of the processor system 404. Blitting can be performed in a fraction of the time that rendering takes. Once blitted into the viewport memory block 410, the high resolution tiles 407 are drawn to the viewport 450. Drawing can be performed via a GPU, and in a non-illustrated embodiment, the blitting and drawing operations can both be performed by the GPU 458. Where a high resolution tile is not available in the tile memory block 406 for copying to the viewport memory block 410 (e.g., 443, 445, 447), a portion of the thumbnail image 414 in the thumbnail memory block 406 can be copied, or blitted, to the viewport memory block 210 (e.g., 442, 444, 446) and drawn to the viewport 450. In this way, tiles 411 that are drawn to the viewport 450 are never, or substantially never, displayed as blanks, but rather, when not available in the tile memory block 404, they are drawn from low resolution tiles, as blitted from the thumbnail image 414.

In some embodiments, the GPU 458 is a part of a CPU. For instance, a CPU may include graphics cores and general processing cores, where the graphics cores perform the functions of GPU 458. The web rendering engine 456 can be software, hardware, firmware, or a combination of these. The web rendering engine 456 is a part of, or runs on, the processor system 404. In some embodiments, the web rendering engine 456 is built into a web browser running on the processor system 404. Any one or more of the memory blocks 402, 406, 408, 410 can be a portion of device 400 RAM, virtual memory, or cache on the processor system 404, to name three non-limiting examples.

Figure 5:
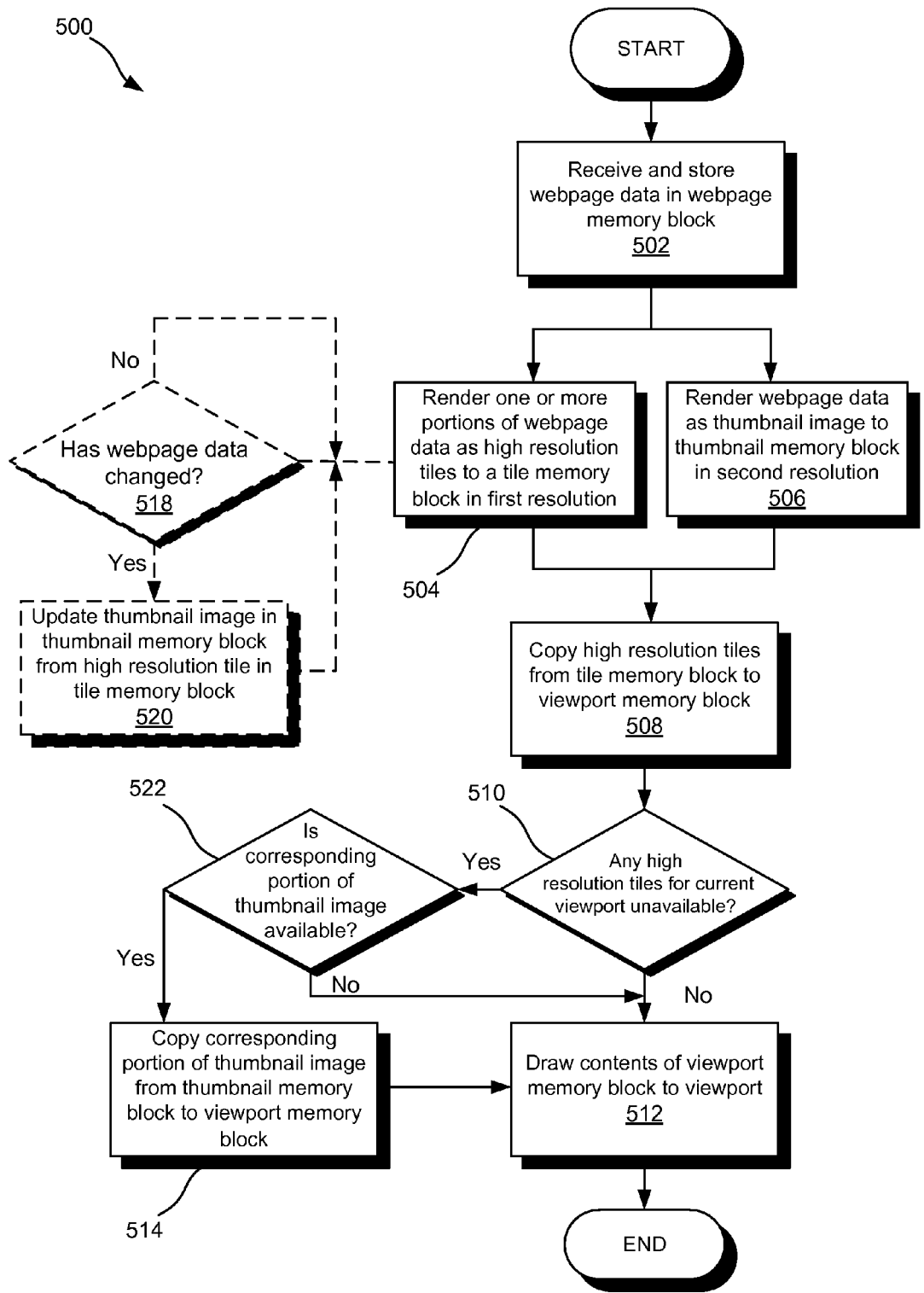
FIG. 5 illustrates one embodiment of a method for carrying out functionality described in at least FIGS. 2-4.

FIG. 5 illustrates one embodiment of a method for carrying out functionality described in at least FIGS. 2-4. This description will include references to figure numbers in FIGS. 2-4. The method 500 begins with a receive operation 502 that receives and stores webpage data in a webpage memory block. The method 500 can then render one or more portions of webpage data as high resolution tiles to a tile memory block in a first resolution in a first render operation 504. The method 500 can also render the webpage data as a thumbnail image to a thumbnail memory block in a second render operation 506 that can occur in parallel to the first render operation 504. The second rendering can be performed at a second resolution that is lower than the first resolution—hence this rendering is called a thumbnail image. High resolution tiles can then be copied (or blitted) from the tile memory block to a viewport memory block in a first copy operation 508.

The method 500 then begins to draw to a viewport of a display device such as viewport 250 or 450 and display device 212 or 412. The method 500 first determines if any high resolution tiles to be drawn to a current viewport are unavailable. If all high resolution tiles are available, then the method can draw the contents of the viewport memory block to the viewport in a draw operation 512.

If the high resolution tile availability decision 510 determines that at least one high resolution tile is not available, then the method 500 can supplement the missing tiles with tiles created from portions of the thumbnail image. Unavailability can be caused by complex content or a lack of processing resources being available at the time of rendering. Missing tiles 243, 245, and 247 in FIG. 2 are examples of unavailable tiles. A thumbnail image availability decision 522 determines whether a portion of the thumbnail image corresponding to the one or more unavailable tiles is available. If not, then the draw operation 512 draws the contents of the viewport memory block, which may include one or more blank tiles. On the other hand, if one or more portions of the thumbnail image corresponding to the unavailable high resolution tiles are available, then a copy operation 514 copies these corresponding portions of the thumbnail image from the thumbnail memory block to the viewport memory block. The draw operation 512 then draws the contents of the viewport memory block, which now includes both high resolution and low resolution tiles.

In an optional embodiment, the thumbnail image can be updated to account for dynamic webpages or changes to static webpages. In particular, the receive operation 502 may continually or periodically receive webpage data that passes through the method 500 in order to update the webpage as described above, for instance where the webpage includes dynamic portions such as animation or video. As these updates come through, an optional decision 518 can determine if the webpage data has changed. This decision loops until a change is noted, and then the thumbnail image is updated in optional update operation 520. In particular, after an updated high resolution tile is rendered, the high resolution tile can be copied and the resolution of the copy can be reduced to a resolution similar to the thumbnail image resolution. This low-resolution tile can then be used to replace a corresponding portion of the thumbnail image. A processor, processor system, and/or GPU can carry out the optional update operation 520.

Webpage data can be HTML, JavaScript, CSS, or a combination of these, to name a few non-limiting examples. The webpage data can be stored in a portion of a memory such as the webpage memory block 202 or 402. In some instances, the webpage data can be received and stored without modification. In other instances, the webpage data may be translated or converted such that it can be rendered into image data such as the high resolution tiles 207 and/or the thumbnail image 214 of FIG. 2.

The webpage data can be received via a network interface of the computing device 200 or 400 from a remote web server.

The high resolution tiles rendered to the tile memory block can have a first resolution, also known as a high resolution, since the resolution is equivalent to, or substantially equivalent to, a resolution of a display device, such as display device 212 or 412. The tile memory block can be embodied as the tile memory block 206 or 406. The high resolution tiles can be embodied as the high resolution tiles 207 or 407. The first rendering can be performed via a processor such as processor 204, a processor system such as processor system 504, and/or a web rendering engine such as web rendering engine 456.

The thumbnail image (e.g., 214 or 414) rendered to the thumbnail memory block can have a second resolution, also known as a low resolution, since the resolution is less than a resolution of the display device, such as display device 212 or 412. The thumbnail memory block can be embodied as the thumbnail memory block 208 or 408. The second rendering can be performed via a processor such as processor 204, a processor system such as processor system 504, and/or a web rendering engine such as web rendering engine 456.

High resolution tiles, such as high resolution tiles 207 and 407 can be copied or blitted to the viewport memory block, such as viewport memory block 210 and 410, via a processor, such as processor 204, a processor system, such as processor system 404, and/or a GPU, such as GPU 458. As noted before, blitting is a much faster process than rendering and is much less taxing on the processor or on a processor system.

Unavailable can mean that the high resolution tile has not been rendered to or has not completed rendering to the tile memory block, such as missing high resolution tiles 243, 245, and 247 in FIG. 2. Unavailable can alternatively mean that a high resolution tile has not been blitted to the viewport memory block 210 or 410. The answer to the high resolution tile availability decision 510 is yes whenever even a single high resolution tile is unavailable. In some embodiments, a processor or processor system can perform the high resolution tile availability decision 510.

The draw operation 512 draws to a viewport of a display device all tiles in a viewport memory block. Using FIG. 2 as an example, there are thirteen high resolution tiles and three tiles 242, 244, 246 copied from portions of the thumbnail image (i.e., low resolution tiles) that the draw operation 512 draws to the viewport. In some embodiments, the draw operation 512 can be carried out via a GPU or display controller, such as the GPU 458 in FIG. 4.

The corresponding portion of the thumbnail image is a portion of the thumbnail image that corresponds to a missing tile in either the viewport memory block or the tile memory block, depending upon which is analyzed in the high resolution tile availability decision 510. A processor, processor system, and/or a GPU can perform the copying (or blitting). For instance, there may be a mapping of the thumbnail imagery that can be used to identify a portion corresponding to a missing tile. In one embodiment, there may be a mapping of the webpage data to the thumbnail image and a mapping to the high resolution tiles. In this way, when there is a missing high resolution tile, the mappings can be used to identify what portion of the thumbnail image corresponds to the missing tile.

Figure 1:
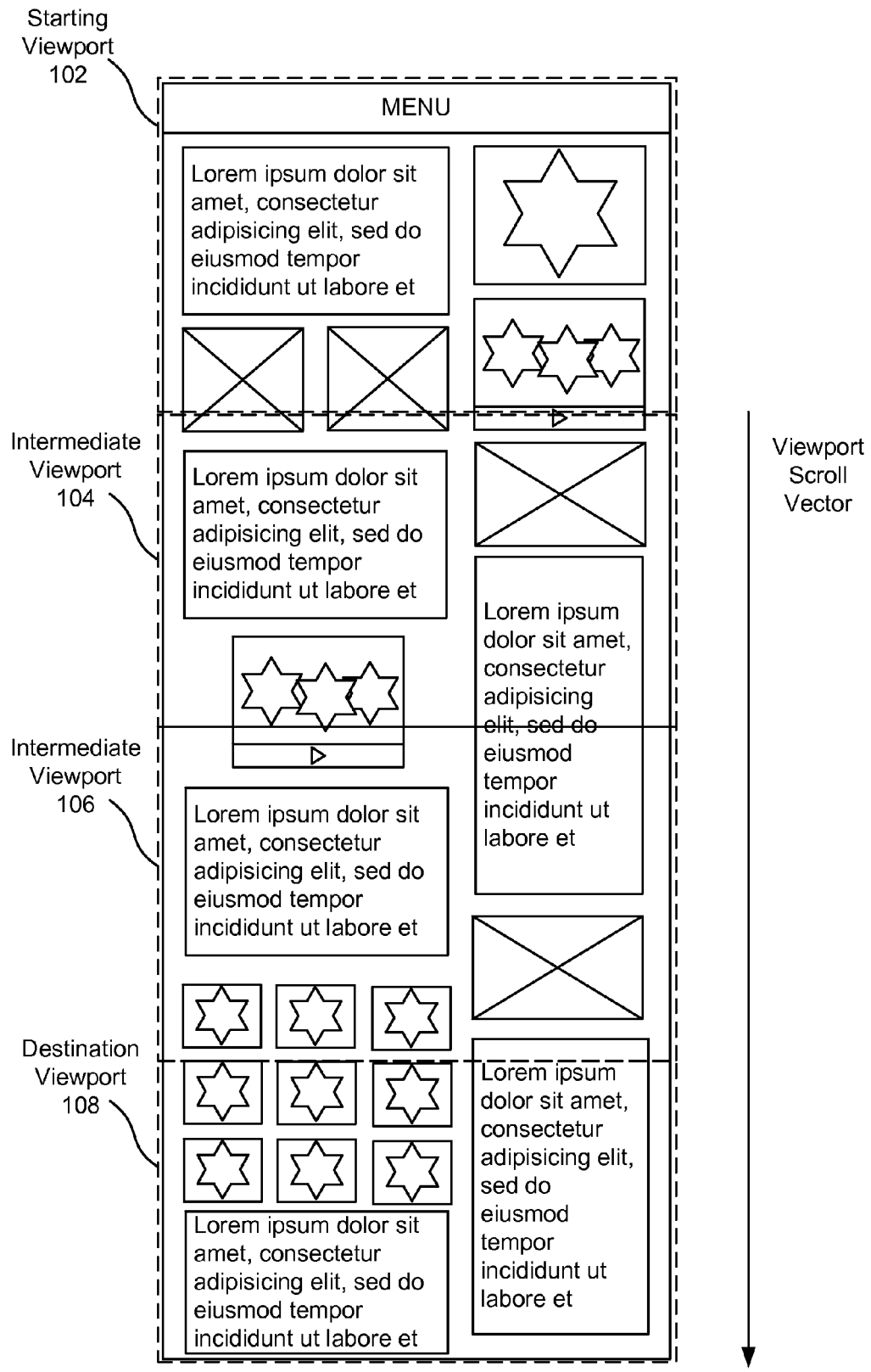
FIG. 1 illustrates a current viewport's movement down a webpage during scrolling.

Further embodiments of the disclosure describe systems and methods for improving a user experience during scrolling by prioritizing rendering resources on a destination viewport rather than a next visible viewport. Typically, a current viewport, such as current viewport 102 in FIG. 1, is rendered without degraded user experience. During scrolling, system resources attempt to render the next viewport, intermediate viewport 104, and then the next viewport, intermediate viewport 106, and then the destination viewport 108. However, system resources sometimes cannot keep up with the fast pace of scrolling and thus leave certain tiles, especially complex ones (e.g., images), blank. Additionally, the destination viewport may not have completed rendering when the current viewport reaches the destination viewport, and thus system resources may have been spent rendering high quality tiles in intermediate viewports that the user was not interested in. By prioritizes rendering of the destination viewport 108 over rendering of the intermediate viewports 104, 106, and partially rendering the intermediate viewports 104, 106 in lower resolution, the user can experience unflawed destination viewports, while motion blur hides the fact that intermediate viewports 104, 106 may not have been fully rendered in high resolution.

Figure 9:
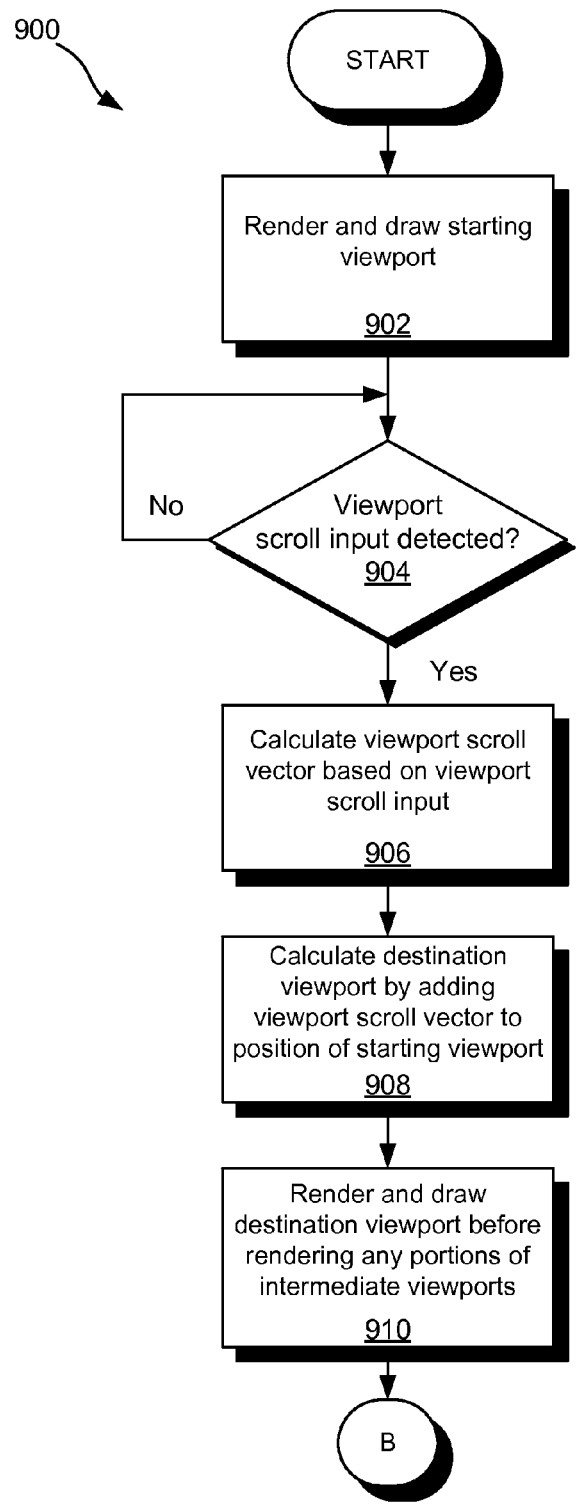
FIG. 9 illustrates a method for improving a user experience during scrolling.

FIG. 9 illustrates a method for improving a user experience during scrolling. In particular, a starting viewport (e.g., starting viewport 108) is rendered and drawn to a display device via a render starting viewport operation 902 followed by recognition of a viewport scroll input from the user as determined by viewport scroll input detected decision 904. From the viewport scroll input, a viewport scroll vector is calculated, which may have a distance and direction, via a calculate viewport scroll vector based on viewport scroll input operation 906. The viewport scroll vector can be used to calculate a destination viewport. This can be done by adding the viewport scroll vector to a position of the starting viewport via a calculate destination viewport operation 908. Referring to FIGS. 1 and 6, the starting viewports 102 and 602 can be seen as those viewports seen when the method 900 begins (and before scrolling begins), and the destination viewports 108 and 608 are those that will be seen when scrolling ends. The viewport scroll vectors 110 and 610 can be seen, and both have the same distance and direction. The destination viewport can then be rendered and drawn to the display device in a render destination viewport operation 910. The destination viewport can be rendered before any intermediate viewports 104, 106, 604, 606 are rendered. The render destination viewport operation 910 leads into operation 1002 of FIG. 10 as indicated by the connector "B".

Once the destination viewport is rendered and drawn, if any remaining time and/or cache remains, intermediate viewports adjacent to the destination viewport can also be rendered and drawn. At the same time, as the next intermediate viewport is rendered and drawn, some tiles that are processor-intensive to draw, such as tiles 612, may not render by the time that a viewport is ready to be drawn or by the time that a viewport is finished being drawn. In such instances, what would otherwise be blank tiles 612 can be drawn in low resolution from a thumbnail image. This is shown in FIG. 10.

Figure 10:
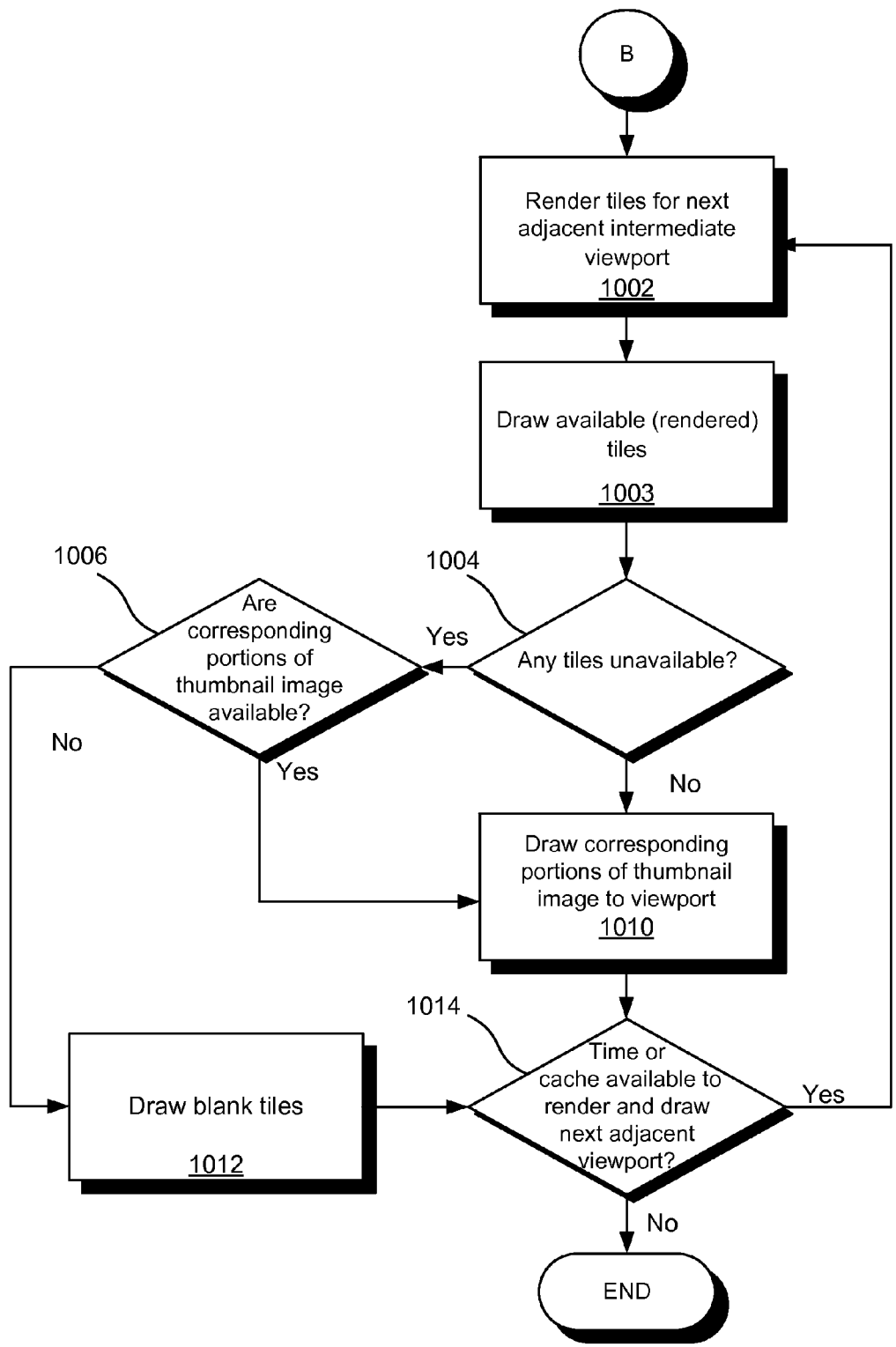
FIG. 10 illustrates a continuation of the method of FIG. 9 that shows intermediate viewport rendering operations along with operations for rendering and drawing both high and low resolution tiles.

FIG. 10 illustrates a continuation of the method of FIG. 9 that shows intermediate viewport rendering operations along with operations for rendering and drawing both high and low resolution tiles. In render operation 1002, tiles for a next adjacent viewport are rendered. For instance, in FIG. 1, the intermediate viewport 108 is the next adjacent viewport to the destination viewport 110. Then draw operation 1003 draws available tiles—those tiles that rendered in render operation 1002. For instance, in FIG. 6, if destination viewport 608 has rendered and been drawn to the display device, then portions of intermediate viewport 606 will render and draw next, since intermediate viewport 606 is adjacent to the destination viewport 608. Tiles 612 are not available however, and thus are not drawn in draw operation 1003.

The decision 1004 then determines if there are any unavailable tiles. If yes, then a decision 1006 determines if any corresponding portions of a thumbnail image are available. Typically, the thumbnail image will have rendered by this time and thus be available. If the corresponding portions of the thumbnail image are available, then a draw operation 1010 draws the corresponding portions of the thumbnail image to the viewport. In FIG. 6, the tiles 612 can be drawn from portions of the thumbnail image.

In some cases, the thumbnail image will not have been rendered yet, or the rendering will not be complete, or some other factor will cause the thumbnail image to be unavailable for drawing. In such cases, the method draws blank tiles in operation 1012 where the unavailable tiles would otherwise be drawn. Whether the missing tiles draw from the high resolution tiles, from the thumbnail image, or are drawn as blanks, decision 1014 determines if time and/or cache are available to render and draw a next adjacent viewport. For instance, in FIG. 6, intermediate viewport 604 is the next adjacent viewport after intermediate viewport 606 has rendered.

If time or cache are not available, then the method ends. However, if time and cache are available for further rendering, then the method swings back to render tiles for next adjacent intermediate viewport operation 1002.

The decision 1014 may check a remaining cache value to see if there is sufficient unused cache to render one or more additional tiles. The decision 1014 can also perform a calculation to determine if tiles in the next adjacent intermediate viewport can be rendered before the current viewport scrolls past those tiles, thus making rendering of those tiles superfluous. In some instances, the decision 1014 determines that by the time one or more tiles are rendered and ready to be drawn to the display device, the draw commands will no longer seek those tiles.

Although FIG. 1 is illustrated as having only two intermediate viewports 104 and 106, in other embodiments any number of viewports may exist. For instance, given a small webpage there may only be a starting viewport and a destination viewport, or a starting viewport and a destination viewport that overlap. Yet, in another embodiment, there may be tens of intermediate viewports. In some embodiments, viewports can overlap while in others the viewports can be adjacent and non-overlapping, as illustrated in FIGS. 1 and 6. In some instances, adjacent viewports may overlap by all but a single row of tiles. While only vertically-adjacent viewports are illustrated, in some embodiments, there may be multiple viewports stretching horizontally. In other words, scrolling can be performed horizontally as well as vertically. Since the viewport scroll vector can have any direction, scrolling can also occur in any direction, including at non-right angles.

Figure 7:
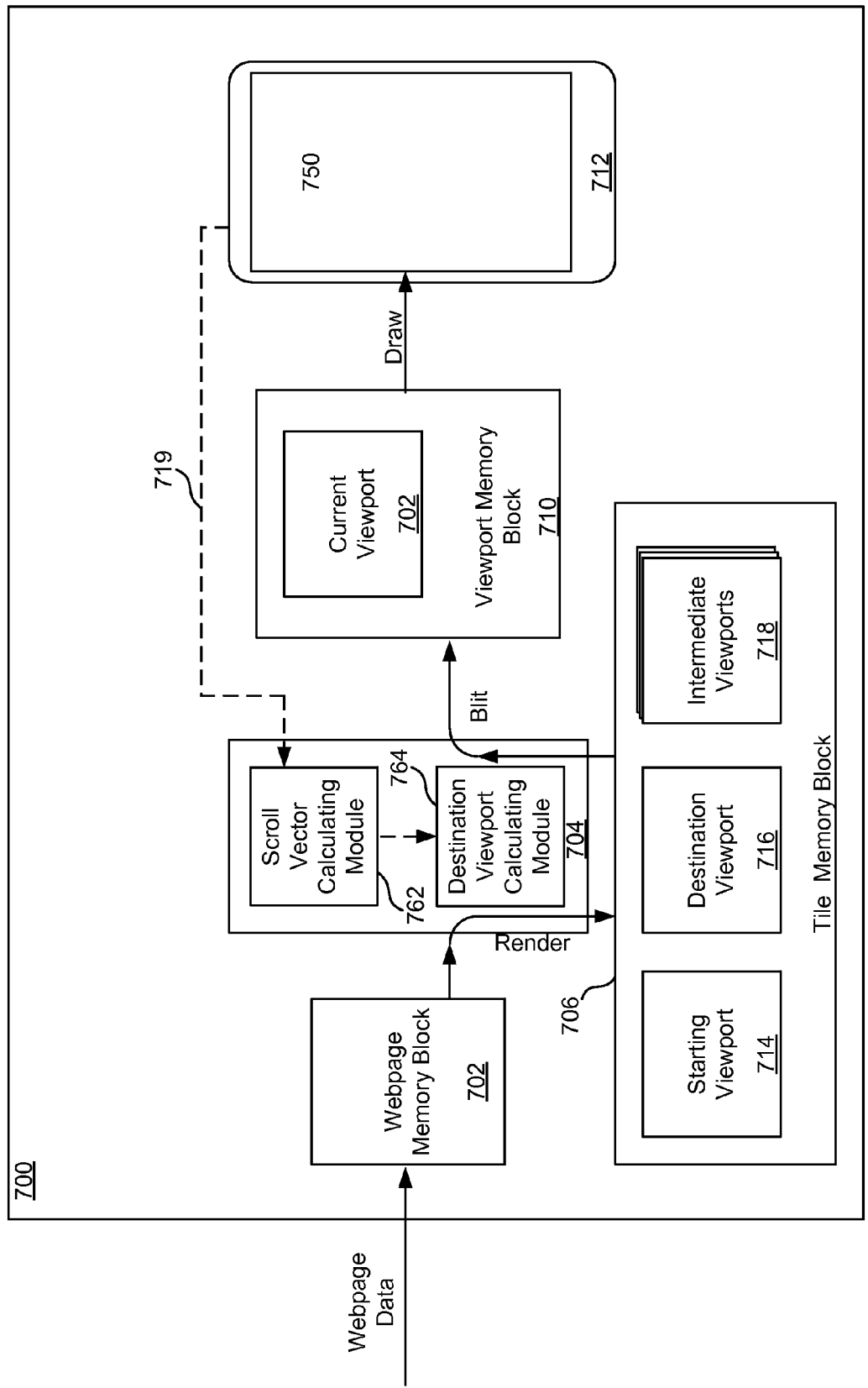
FIG. 7 illustrates a system for improving a user experience during scrolling.

FIG. 7 illustrates a system for improving a user experience during scrolling. The system 700 receives webpage data to a webpage memory block 702. A processor system 704 renders the webpage data into tiles that are stored in a tile memory block 706. Tiles can be rendered for one or more viewports, for instance, a starting viewport 714, a destination viewport 716, and one or more intermediate viewports 718.

When a user scrolls the viewport 750, this input can generate a signal that is passed back to the processor system 704 and to a scroll vector calculating module 762. The signal can pass via communication path 719. The scroll vector calculating module 762 determines a viewport scroll vector based on the signal and passes data representing the viewport scroll vector to a destination viewport calculating module 764. This adds the viewport scroll vector to a location of the starting viewport 714 to determine a location of the destination viewport 716. Based on this calculation, the processor system 704 can determine what portions of the webpage data are to be rendered to the tile memory block 706 and in what order. Thus, the viewport scroll input from the display device 712 is used to determine what tiles to render into the tile memory block 706.

As tiles are rendered to the tile memory block 706, the processor system 704 blits or copies available tiles (those that have finished rendering to the tile memory block 706) to the viewport memory block 710. The blitted tiles correspond to a current viewport 702. These tiles can then be drawn to a viewport 750 of a display device 712.

In some cases, the tile memory block 706 may only be large enough to store tiles for a starting viewport 714. In others, there may be room to store the starting viewport 714 and at least some tiles of the destination viewport 716. In yet others, there may be room to store the starting viewport 714, the destination viewport 716, and at least some tiles of one or more intermediate viewports 718.

Timing can also limit what is stored in the tile memory block 706. Where the current viewport has already scrolled past tiles to be rendered, these tiles are drawn as blanks or drawn from a thumbnail image.

Figure 8:
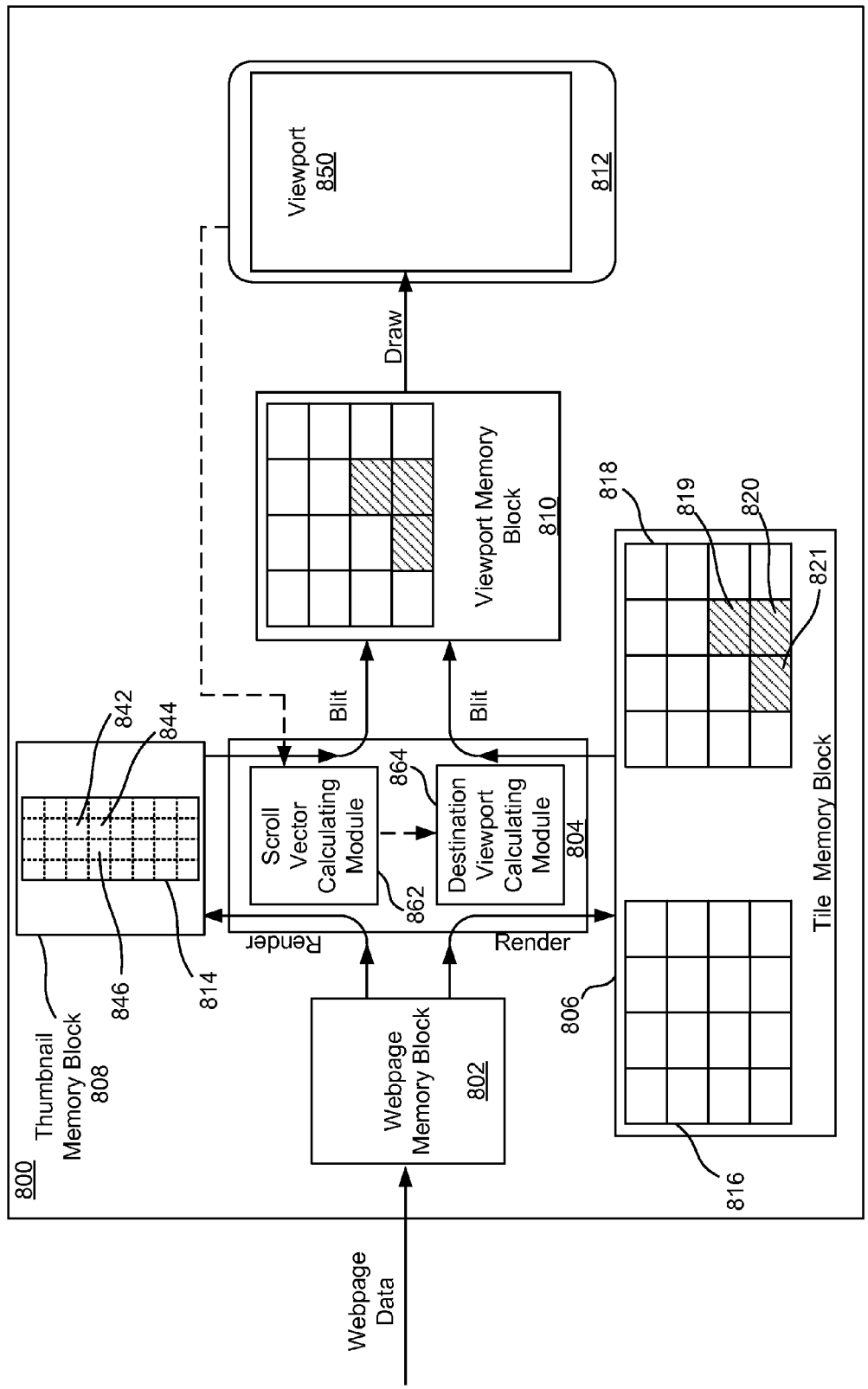
FIG. 8 illustrates another system for improving a user experience during scrolling.

FIG. 8 illustrates another system for improving a user experience during scrolling. The system 800 receives webpage data to a webpage memory block 802. A processor system 804 renders the webpage data into tiles that are stored in a tile memory block 806. Tiles can be rendered for one or more viewports, for instance, a destination viewport 816 and a next adjacent intermediate viewport 818.

When a user scrolls the current viewport, this input can generate a signal that is passed back to the processor system 804 and to a scroll vector calculating module 862. The scroll vector calculating module 862 determines a viewport scroll vector based on the signal and passes data representing the viewport scroll vector to a destination viewport calculating module 864. The destination viewport calculating module 864 adds the viewport scroll vector to a location of the starting viewport 816 to determine a location of the destination viewport 818. Based on this calculation, the processor system 804 can determine what portions of the webpage data are to be rendered to the tile memory block 806 and in what order. Thus, the viewport scroll input from the display device 812 is used to determine what tiles to render into the tile memory block 806.

The processor system 804 can also render a thumbnail image 814 of the webpage data to a thumbnail memory block 808. Portions of the thumbnail image 814 can be blitted to the viewport memory block 810 in instances where a high resolution tile in the tile memory block 806 is not available for blitting to the viewport memory block 810.

As tiles are rendered to the tile memory block 806, the processor system 804 blits or copies available tiles (those that have finished rendering to the tile memory block 806) to the viewport memory block 810. In this embodiment, the blitted tiles correspond to tiles of the next adjacent viewport 818. However, some of the tiles in the next adjacent viewport have not rendered or completed rendering to the tile memory block 806. The processor system 804 can blit the available tiles to the viewport memory block 810 and recognizing that some of the tiles in the adjacent intermediate viewport 818 are not available 819, 820, 821, can turn to corresponding portions 842, 844, 846 of the thumbnail image 814 and blit these portions to the viewport memory block 810.

The viewport memory block 810 includes tiles blitted from the tile memory block 806 as well as the thumbnail memory block 808. All tiles in the viewport memory block 810, the contents of the viewport memory block 810, can be drawn to the viewport 850 so that no or substantially no tiles are drawn as blanks.

Figure 11:
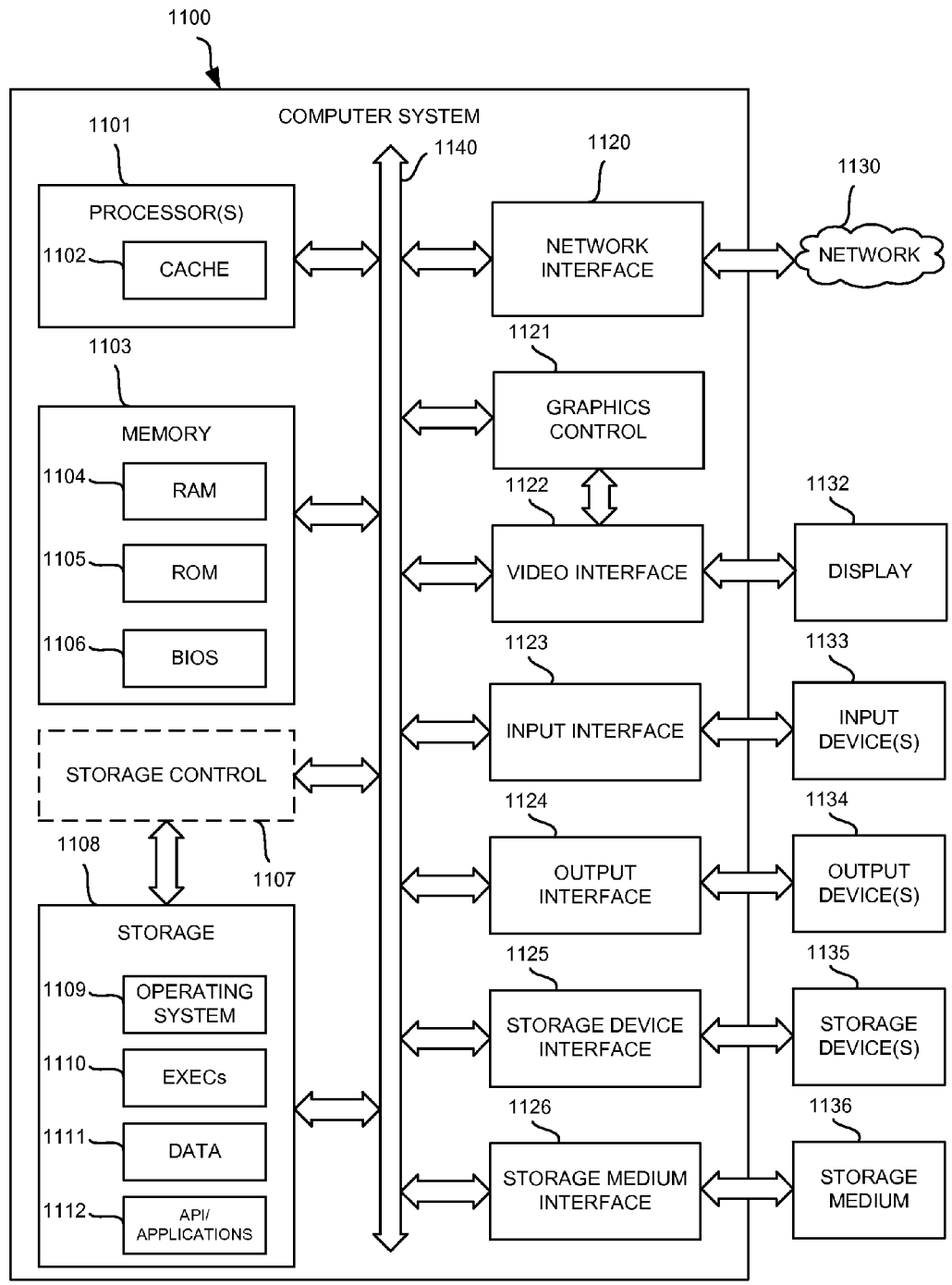
FIG. 11 shows a diagrammatic representation of one embodiment of a machine in the exemplary form of a computer system within which a set of instructions can execute for causing a device to perform or execute any one or more of the aspects and/or methodologies of the present disclosure.

The systems and methods described herein can be implemented in a machine such as a computer system in addition to the specific physical devices described herein. FIG. 11 shows a diagrammatic representation of one embodiment of a machine in the exemplary form of a computer system 1100 within which a set of instructions can execute for causing a device to perform or execute any one or more of the aspects and/or methodologies of the present disclosure. The components in FIG. 11 are examples only and do not limit the scope of use or functionality of any hardware, software, embedded logic component, or a combination of two or more such components implementing particular embodiments.

Computer system 1100 may include a processor 1101, a memory 1103, and a storage 1108 that communicate with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various tangible storage media 1136. All of these elements may interface directly or via one or more interfaces or adaptors to the bus 1140. For instance, the various tangible storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1101 (or central processing unit(s) (CPU(s))) optionally contains a cache memory unit 1102 for temporary local storage of instructions, data, or computer addresses. Processor(s) 1101 are configured to assist in execution of computer readable instructions. Computer system 1100 may provide functionality as a result of the processor(s) 1101 executing software embodied in one or more tangible computer-readable storage media, such as memory 1103, storage 1108, storage devices 1135, and/or storage medium 1136. The computer-readable media may store software that implements particular embodiments, and processor(s) 1101 may execute the software. Memory 1103 may read the software from one or more other computer-readable media (such as mass storage device(s) 1135, 1136) or from one or more other sources through a suitable interface, such as network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software.

The memory 1103 may include various components (e.g., machine readable media) including, but not limited to, a random access memory component (e.g., RAM 1104) (e.g., a static RAM "SRAM", a dynamic RAM "DRAM", etc.), a read-only component (e.g., ROM 1105), and any combinations thereof. The RAM can be main RAM or GPU RAM. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable tangible computer-readable media described below. In one example, a basic input/output system 1106 (BIOS), including basic routines that help to transfer information between elements within computer system 1100, such as during start-up, may be stored in the memory 1103. The memory 1103 can include virtual memory or cache (e.g., on the CPU or GPU).

Fixed storage 1108 is connected bidirectionally to processor(s) 1101, optionally through storage control unit 1107. Fixed storage 1108 provides additional data storage capacity and may also include any suitable tangible computer-readable media described herein. Storage 1108 may be used to store operating system 1109, EXECs 1110 (executables), data 1111, API applications 1112 (application programs), and the like. Often, although not always, storage 1108 is a secondary storage medium (such as a hard disk) that is slower than primary storage (e.g., memory 1103). Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide nonvolatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, LIGHTNING, or any combination of the above.

In particular embodiments, when computer system 1100 is connected to network 1130, computer system 1100 may communicate with other devices, specifically mobile devices and enterprise systems, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1130, may employ a wired and/or a wireless mode of communication. In general, any network topology may be used.

Information and data can be displayed through a display 1132. Examples of a display 1132 include, but are not limited to, a liquid crystal display (LCD), an organic liquid crystal display (OLED), a cathode ray tube (CRT), a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121.

In addition to a display 1132, computer system 1100 may include one or more other peripheral output devices 1134 including, but not limited to, an audio speaker, a printer, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, LIGHTNING, and any combinations thereof.

In addition or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computing device for rendering and displaying portions of a webpage, the computing device comprising:
   a viewport;
   a webpage memory block that receives and stores data used to render a webpage in response to a user request for display of the webpage;
   a thumbnail memory block that stores a thumbnail image of the webpage rendered from the data in a first resolution in response to a user request for display of the webpage;
   a tile memory block that stores the webpage as one or more tiles, each of the one or more tiles rendered from one or more portions of the data in a second resolution higher than the first resolution such that the one or more tiles are rendered in a higher resolution than the thumbnail image;
   a viewport memory block that stores both: (1) a subsection of the thumbnail image; and (2) the one or more tiles, wherein the one or more tiles are rendered at a higher resolution than the subsection of the thumbnail image; and
   a processor system that:
      renders the thumbnail image of the webpage from the data to the thumbnail memory block;
      determines that a tile to be copied from the tile memory block to the viewport memory block has yet to be rendered from the webpage memory block to the tile memory block; and in response
      copies a subsection of the thumbnail image from the thumbnail memory block to the viewport memory block, the subsection comprising an equivalent subsection of the webpage as the tile that was not rendered; and upon the tile rendering to the tile memory block
      copies the tile from the tile memory block to the viewport memory block thereby overwriting the subsection of the thumbnail image in the viewport memory block.

2. The computing device of claim 1, wherein the tile memory block is a tiled backing store.

3. The computing device of claim 1, wherein a display controller draws contents of the viewport memory block to the viewport.

4. The computing device of claim 3, wherein the display controller is part of the processor system.

5. The computing device of claim 1, wherein the processor system updates the thumbnail image by:
   copying one of the one or more tiles from the tile memory block to form a copied tile;
   reducing a resolution of the copied tile to form a reduced-resolution tile; and
   updating a corresponding portion, but not all of, the thumbnail image with the reduced-resolution tile.

6. The computing device of claim 1, wherein the processor system comprises a graphics processing unit (GPU).

7. The computing device of claim 6, wherein the processor system further comprises a central processing unit (CPU).

8. The computing device of claim 7, wherein the processor system comprises at least two cores.

9. The computing device of claim 8, wherein the one or more tiles are rendered via at least a first of the at least two cores and the thumbnail image is rendered via at least a second of the at least two cores in parallel.

10. A method of rendering a webpage comprising:
    providing a thumbnail memory block comprising a thumbnail image;
    providing a tile memory block comprising tile images;

copying the tile images from the tile memory block to a viewport memory block of a computing device, each tile image being a rendering of a subsection of the webpage in a first resolution;

determining that copying one of the tile images is not possible at this time because the one of the tile images has yet to be rendered to the tile memory block;

copying a subsection of the thumbnail image from the thumbnail memory block of the computing device to the viewport memory block in place of the one of the tile images that has yet to be rendered, the subsection of the thumbnail image comprising an equivalent subsection of the webpage as the one of the tile images that has yet to be rendered, the thumbnail image being a rendering of the webpage in a second resolution lower than the first resolution; and upon an availability in the tile memory block of the one of the tile images that has yet to be rendered, copying the one of the tile images to the viewport memory block and thereby overwriting the subsection of the thumbnail image in the viewport memory block.

11. The method of claim 10, further comprising drawing the tile images and the subsection of the thumbnail image as a single frame within a viewport.

12. A system for rendering webpage data to a viewport of a display device, the system comprising:

a webpage memory block configured to store the webpage data;

a tile memory block configured to store tiles, wherein the tiles are rendered from the webpage data in response to a user request for display of the webpage;

a thumbnail memory block configured to store a thumbnail image, wherein the thumbnail image is rendered from the webpage data such that the thumbnail image is rendered in a lower resolution than the tiles in response to a user request for display of the webpage;

a viewport memory block configured to store tiles copied from the memory block, and one or more subsections of the thumbnail image copied from the thumbnail memory block when one or more tiles are not copied to the viewport memory block in time for drawing from the viewport memory block to the display device; and a processor configured to:
 render the webpage data from the memory block into the tiles in the tile memory block and into the thumbnail image in the thumbnail memory block;
 copy the tiles in the tile memory block to the viewport memory block;
 determine if one or more missing tiles have not been copied to the viewport memory block in time for drawing all of the tiles to the display device; and in response to said determination
 copy one or more subsections of the thumbnail image from the thumbnail memory block to the viewport memory block, where the one or more subsections correspond to the missing tiles.

* * * * *